United States Patent [19]

Buckley

[11] Patent Number: 4,524,757
[45] Date of Patent: Jun. 25, 1985

[54] SOLAR COLLECTOR, HEAT EXCHANGER OR HOT WATER STORAGE TANK AND METHOD OF FORMING SAME

[75] Inventor: Bruce S. Buckley, 1321 Grizzly Peak, Berkeley, Calif. 94708

[73] Assignee: Bruce Shawn Buckley, San Jose, Calif.

[21] Appl. No.: 565,533

[22] Filed: Dec. 29, 1983

Related U.S. Application Data

[63] Continuation of Ser. No. 258,519, Apr. 28, 1981, abandoned.

[51] Int. Cl.³ .............................................. F24J 3/02
[52] U.S. Cl. .................................. 126/426; 126/444; 165/46; 428/247
[58] Field of Search ............... 126/415, 417, 426, 434, 126/444, 445, 449, 450; 165/46, 170; 5/444, 458; 428/178, 247, 256; 52/2

[56] References Cited

U.S. PATENT DOCUMENTS

| 3,008,214 | 11/1961 | Foster et al. | 428/178 |
|---|---|---|---|
| 3,022,781 | 2/1962 | Andrassay | 126/426 |
| 4,079,726 | 3/1978 | Voelker | 126/426 |
| 4,087,577 | 5/1978 | Hendrickson | 428/247 |
| 4,228,790 | 10/1980 | Davison et al. | 126/444 |
| 4,256,087 | 3/1981 | Sowers | 126/415 |
| 4,287,876 | 9/1981 | Jacques | 126/426 |
| 4,313,421 | 2/1982 | Trihey | 126/415 |
| 4,328,790 | 5/1982 | Kircus | 126/426 |

FOREIGN PATENT DOCUMENTS

| 2722613 | 12/1977 | Fed. Rep. of Germany | 126/426 |
|---|---|---|---|
| 11-2900 | 3/1936 | Japan | 126/434 |
| 25697 | 3/1981 | Japan | |
| 2057673 | 4/1981 | United Kingdom | 126/426 |

Primary Examiner—Margaret A. Focarino
Attorney, Agent, or Firm—Burns, Doane, Swecker & Mathis

[57] ABSTRACT

A solar collector, or absorber, panels or a heat storage tank, suitable for heating water using solar energy is formed from two sheets of uncured elastic material, such as EPDM rubber, by simultaneously bonding and curing the peripheral edges of the two sheets and at spaced apart, discrete areas over most of the interior areas of the sheets. In one form one of the sheets is coated with a layer of release agent, over all areas except the discrete areas and the peripheral areas so that only such uncoated areas will bond during cure. In another form, a sheet of non-adherent plastic, slightly smaller than the two sheets and having holes or holidays to form the discrete areas, is bonded between the two sheets. In a third form, the peripheral edges are first sealed to form a chamber, then the chamber is inflated and a forming die presses together the discrete areas only. Reinforcing fibers are employed or molded, into at least one of the uncured sheets. Woven fabric sheets may be stitched or fastened together, coated with a thermosetting plastic and then formed into a panel or tank chamber as above. In the solar collector panel embodiment, at least one of the reinforcing fibers is metal, most preferably, in a metal screen to equalize temperatures between the bonded discrete areas and areas overlying liquid carrying volumes of the panel.

12 Claims, 16 Drawing Figures

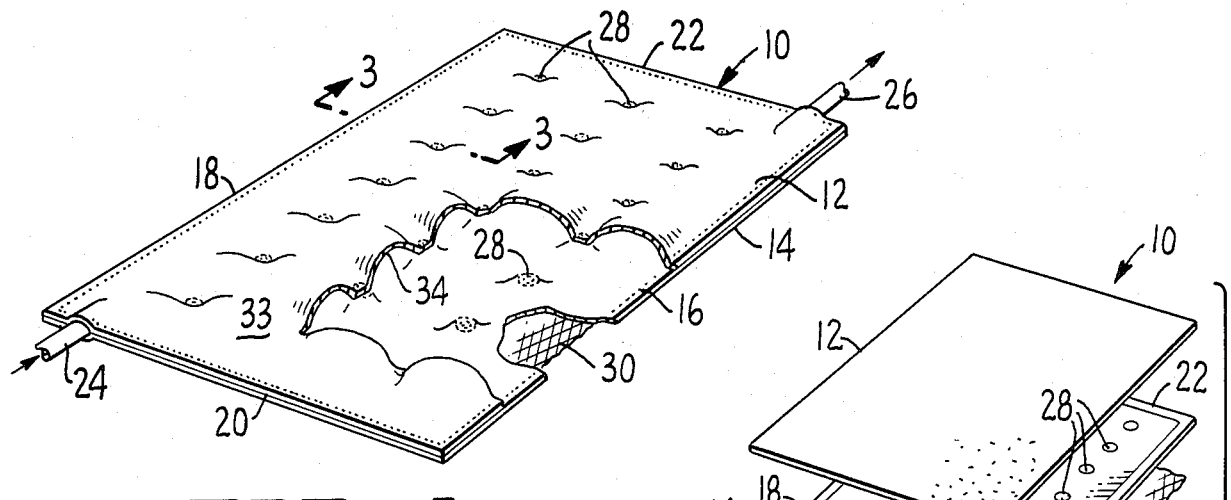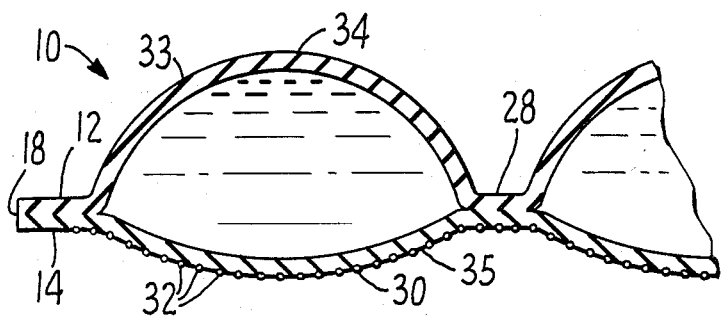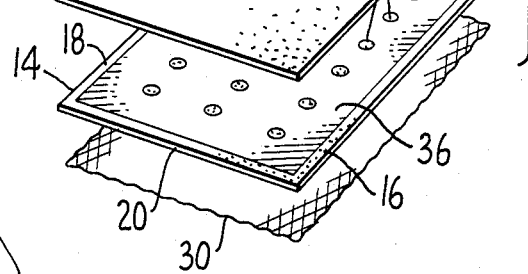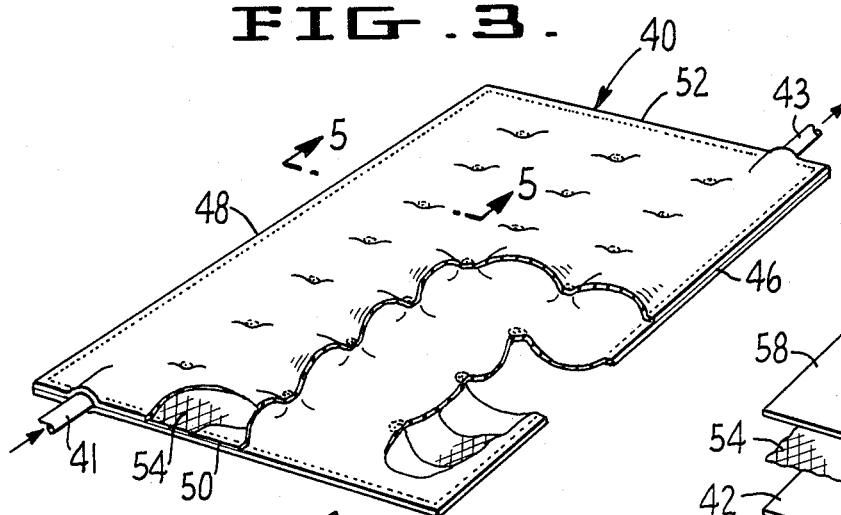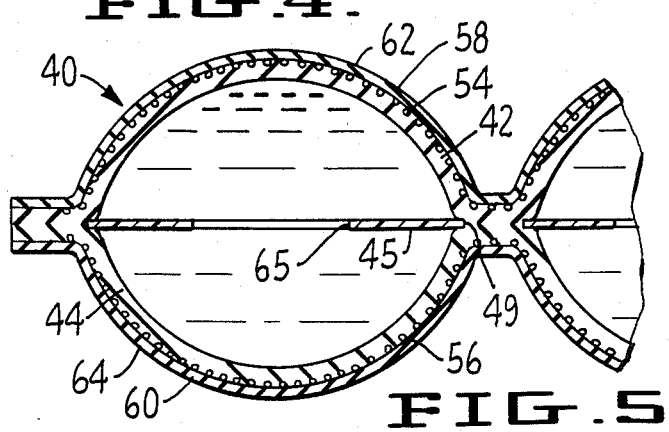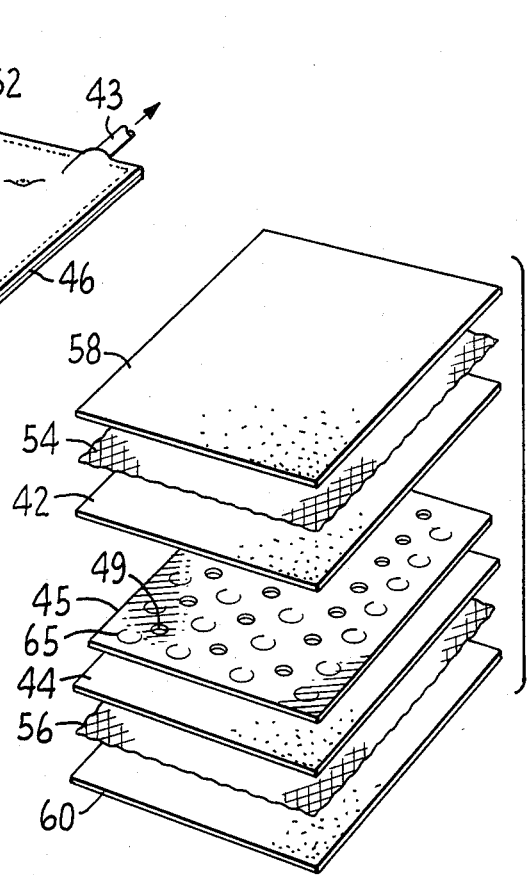

SOLAR COLLECTOR, HEAT EXCHANGER OR HOT WATER STORAGE TANK AND METHOD OF FORMING SAME

This application is a continuation, of application Ser. No. 258,519, filed Apr. 28, 1981, now abandoned.

FIELD OF INVENTION

The present invention relates to solar water heating. More particularly it relates to a method of forming heat exchangers, hot water storage tanks and solar collector units, primarily useful in solar hot water heating. Additionally, it is directed to a preferred arrangement of elements forming such units as articles of manufacture and to apparatus using such solar collectors, heat exchangers and hot water storage tanks for solar hot water heating.

It is a particular object of the invention to form a heat exchanger, hot water storage tank or solar collector element from a pair of relatively thin sheets of material that are bonded together around their peripheral edges and at a plurality of discrete areas over a substantial portion of the enclosed area. These bonded discrete areas are of such size and are spaced apart longitudinally and/or laterally with respect to each other, so that the enclosed solar collector, tank or heat exchanger permits free communication laterally, longitudinally, or both for fluid flowing through the unbonded areas. Internal bonding of the discrete areas is accomplished by any one of several methods.

In one form, the sheets are made of an uncured elastic material, such as EPDM (ethylene/propylene terpolymers) formed to a thickness of about 0.015 to 0.060 inch. One of the sheets is partially coated with a release agent. Uncoated areas correspond to discrete areas and around the edges. The uncoated areas are then pressed against the other sheet and such areas are bonded together by a vulcanizing procedure.

Alternatively, a sheet of suitable plastic material, having properties such that it does not bond to the elastic sheets, can be formed with openings corresponding to the discrete areas to be bonded. The plastic material is also made smaller in dimensions than the elastic sheets. In this way, the discrete areas and the peripheral areas of the elastic sheets are bonded through the openings and around the outer edges of the plastic sheet.

A third method for bonding such discrete areas and the peripheral edges of the elastic sheets uses a suitably heated die or forming press. In this method, the two uncured elastic sheets are inserted into a press having the discrete areas and periphery of the finished collector, heat exchanger or hot water storage tank formed as opposed complementary convex surfaces in the two halves of the die. (The surfaces between such discrete areas and the peripheral edges are corresponding concavities to form liquid reservoir volumes.) The edges of the two sheets are then sealed by the die so that the space between the two sheets is inflatable to form a chamber. The two halves of the die are then pressed together against the inflated sidewalls to conform the elastic sheets to the concave and convex surfaces in the die. The discrete areas are thus pressed together along with the peripheral edges. The sheets are then cured to form the collector unit by application of suitable pressure and heat to the die.

A fourth method uses two sheets of woven fabric which are stitched together at the spaced apart, discrete areas and around the periphery. The stitched fabric is then coated with an elastic or non-elastic coating to prevent leakage of liquid from the completed assembly, the stitching structurally reinforces the assembly and prevents the two sheets from pulling apart when the assembly is pressurized. If a non-elastic coating is employed, (for example, the fabric may be coated with a thermosetting plastic such as Derakane, trademark of Dow Chemical Co. for an unsaturated vinyl ester), the coated sheets may be placed in a mold (similar to that described in method three), and internally inflated until the thermoset plastic cures. Alternatively, the coated-sheet assembly may be internally inflated during the cure without use of a constraining mold. In either case, the completed assembly may have additional coated sheets laminated to it further to insure a minimum of fluid leakage. Staples or other fasteners which penetract both sheets of woven fabric are an alternative to stitching of the two sheets.

In each of these methods at least one of the pair of sheets may include tensile filament members embedded therein to provide dimensional stability and to carry stresses imposed on the sheet member. Desirably such filaments are woven as a cloth. When used as a solar collector, at least one of the woven strands may be metal. A fine mesh wire screen is a preferred form of cloth. Such metal filaments increase heat conduction between the bonded areas and unbonded (high heat transfer) areas of the flexible sheet both to improve heat transfer and to protect the solar heat absorbing surface not having direct access to cooling water from thermal degradation.

When the so formed chamber is to serve as a solar collector, simple inlet and outlet connections are formed either as pipe nipples or openings adjacent opposite ends of the chamber. As a heat storage tank, one end of the chamber is either left open (unbonded) or opened, as by slitting after bonding, and the discrete bonded areas omitted over a suitable volume (say ⅓ or less) of the formed chamber so that a heat exchanger coil may be inserted therein. The open end of the tank is then sealed around the inlet and outlet conduits to the coil to close the heat storage tank.

As an assembled solar hot water heater, a solar collector panel and a tank enclosing a heat exchanger, formed in accordance with this invention, are mounted back-to-back in a rigid structure. The structure also serves as mounting means for installing the heater assembly on a roof or ground base, at a suitable angle so that the solar collector panel will efficiently absorb solar energy.

PRIOR ART

As particularly disclosed in my prior patents, such as U.S. Pat. No. 4,137,964 issued Feb. 6, 1979, for "Controllable Heat Transmission Apparatus", it is known to assemble a solar collector or absorber and a liquid storage tank, in which is placed a heat exchanger, as a single unit and to mount it on a roof or the like. A return line near the bottom of the assembly permits cold liquid, usually water, to flow from the storage tank to the solar collector. Solar energy absorbed by the solar collector heats water, and by a thermo-siphoning effect returns the heated water to the top of the storage tank. A one-way valve prevents back flow of heated water from the storage tank when water in the solar collector panel is cooler, as at night or during cloudy weather.

Economically it is important that the solar collector, storage tank and heat exchanger have a long life, say 20 years, under normal operating conditions. Such conditions subject the unit, and particularly the solar collector, to temperatures approaching or equal to boiling water. These high temperatures may occur when no heat is being taken from the heat exchanger over an extended period of time. In domestic hot water heating this can occur when the household is on vacation for several days or weeks during hot weather.

Fundamentally, intrinsically long life materials such as copper, special steels, aluminum and the like are capable of withstanding such conditions, but they can be unduly expensive. Also, they are subject to corrosion and are not readily adaptable to designs requiring freeze tolerance. At low temperatures, molded plastic materials such as polypropylene, polyethylene and the like, have a relatively long life. However, near boiling water temperatures, their structural stability and durability deteriorates. Such materials approach plasticity or disintegration under long exposure of this kind. Further, dimensional stability and strength of such plastics is poor even when only required to withstand the hydraulic head of about 4 psi at near-boiling water conditions, in a panel eight feet high.

Previously known solar collectors or storage tanks, whether made of plastic or metal, have required attachment of small (¼ to ¾ inch diameter) parallel tubes, suitable for thermo-siphoning, to headers such as larger tubes (say about 1 inch to 3 inch diameter). Even where several parts are simultaneously formed by injection molding or extrusion, mechanical assembly is usually required. A particular economic advantage of the present invention lies in the fact that the collector or storage tank is completely formed solely by bonding around the edges and at spaced apart, discrete areas. Thus, in one form of the invention, no separate header is required for complete cross-flow and mixing of liquid flowing through either the collector or storage tank. Alternatively, headers can be integrally formed in the enclosed chamber as some of such spaced apart, discrete areas. Accordingly, relatively uniform heating or cooling of liquid is effected both vertically and laterally through the unit. Such uniform temperature distribution of the liquid flowing in the solar thermosiphon unit is particularly helpful in avoiding hot spots (and thermal degradation) in the sheets forming the solar collector.

Additionally, freezing of liquid in the solar collector in winter not only requires structural strength but also can delay operation of the solar collector during thaw out. A further advantage of the present arrangement of spaced-apart, discrete bonded areas within the collector is the ability to withstand such freezing by expansion to accommodate up to a 10% change in volume without pulling the discrete bonds apart. The present structures also promote subsequent thawing. This again is due to free communication of liquid throughout the thin chamber so formed. Without enlarged volume headers, large solid blocks of ice, frozen either above or below the solar absorption surfaces of the collector, need not be be thawed to restore thermosiphon circulation the next day.

From the foregoing it will be seen that it is a particular object of the invention to provide a low-cost solar water heater which is relatively simple to assemble, and has long life, including low maintenance costs. Maintenance cost is particularly important in a solar water heater because it must be able to tolerate intermittent service and long periods of neglect. Such neglect may include exposure to unusual high temperatures, for example, when a householder is on vacation or away from his home for several weeks, as well as during cycles of freezing anad thawing. Further the present solar heater arrangement makes possible a relatively simple installation on a roof or a ground level pad for easy connection into a domestic water system.

Further objects and advantages of the present invention will become apparent from the following detailed description taken in conjunction with the accompanying drawings which form an integral part of the present specification.

BRIEF DESCRIPTION OF THE DRAWINGS

FIG. 1 is a perspective assembly view of a solar collector or heat storage tank constructed in accordance with the invention and partially in cross-section to show the individual layers of elastic sheets and filaments forming the unit;

FIG. 2 is an exploded view of the arrangement of elements forming the unit shown in FIG. 1 useful in explaining a preferred method of making the unit;

FIG. 3 is a cross-sectional view of a portion of FIG. 1 taken in the direction of arrows 3—3;

FIG. 4 is a perspective assembly view of an alternate embodiment of the invention, similar to FIG. 1, and partially in cross-section to illustrate the several layers of material from which the solar collector or heat storage tank is constructed;

FIG. 5 is a cross-section view in the direction of arrows 5—5 of a portion of FIG. 4;

FIG. 6 is an exploded view of the elastic sheets, separator element and reinforcing fiber arrangements formable into the embodiment of FIG. 5;

FIG. 9 illustrates a "dog bone" configuration wherein the areas are alternately perpendicular to each other. FIG. 10 shows a similar "dog bone" construction in which of the elements are parallel to each other. FIG. 11 show the use of elongated rectangular areas. FIG. 12 shows circular areas for bonding;

BEST MODES OF CARRYING OUT THE INVENTIONS

Figure 7A:
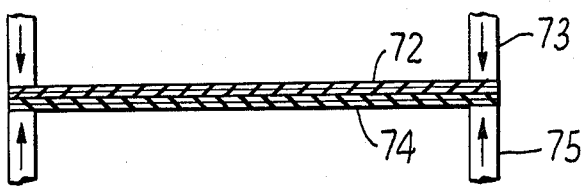
FIGS. 7A, 7B and 7C illustrate an alternate method of constructing a solar collector or heat storage tank similar to that shown in FIGS. 1 and 4 and particularly illustrating the steps of (1) sealing the edges of the panel (FIG. 7A), (2) inflating the so formed chamber (FIG. 7B) and (3) bonding discrete areas in the interior chamber formed (FIG. 7C)

Referring now to the drawings, and in particular to FIG. 1, there is shown a preferred embodiment of a solar collector, heat exchanger or storage tank panel constructed in accordance with the inven- tion.

As particularly shown in FIG. 2, solar panel 10 is formed by bonding together a pair of flexible sheets 12 and 14. Sheets 12 and 14 are bonded along their parallel, opposed edges 16 and 18 and opposed edges 20 and 22. As indicated by the inlet nipple or opening 24 and outlet nipple 26 flow through heat exchanger panel 10 is generally parallel to sides 16 and 18.

Sheet members 12 and 14 are also bonded at a plurality of discrete areas 28. In a preferred embodiment, these areas are sized and spaced apart longitudinally and laterally with respect to each other for maximum strength and adequate flow through panel 10. Since there are no elongated barriers within panel 10, fluid is free to flow both laterally and longitudinally from inlet 24 to outlet 26. As indicated the discrete areas are substantially coextensive with the sidewall areas of element 10.

To give both structural strength and dimensional stability to panel 10, tensile filaments in the form of woven strands or a screen 30 is bonded to or embedded in at least one of the flexible sheet members, such as sheet 14. The primary requirement for such fibers is that they are dimensionally stable and compatible with the environment. Such environment includes heat and water since even though such fibers are embedded on the exterior to the flexible sheets 12 and 4, over time, water will diffuse and migrate through such material.

In FIG. 3, panel 10 is adapted to serve as a solar collector and as shown in cross-section, at least some of the woven strands of screen 30 are metal, such as wires 32. These metal strands increase heat conduction between the bonded areas and the unbonded areas. As indicated by bulges 34 in sheet member 12 between edge 18 and discrete area 28, sidewall 33 formed by sheet 12 is freer to expand under liquid pressure, including freeze expansion, than sidewall 35 which is restrained by tensile filaments 32.

In a preferred method in forming element 10 a pair of flexible sheets, preferably of EPDM, uncured rubber material, is rolled, or calendered, to a thickness within the range of about 0.015 to about 0.060 inches in thickness in an uncured state. One of the sheets, such as 14, as indicated in FIG. 2, is preferably coated with a release agent, a material which will prevent bonding between sheets 14 and 12. This coating is indicated as 36. As there shown the edges around sheet 14 including edges 18-20, 16 and 22 are left uncoated as well as the circular, discrete areas 28 which are to be bonded by applying heat and pressure to the assembled two sheets, 12 and 14. As indicated, screen 30 may be bonded to the backside of sheet 14 simultaneously to incorporate or embed screen 30 on the backside of panel member 14. If desired, screen 30 can be pressed into uncured sheet 14 prior to bonding and curing of panel 10, or the screen may be calendared so that it is located in the center of the EPDM sheet.

FIGS. 4, 5 and 6 illustrate an alternative arrangement for constructing the collector, heat exchanger or storage tank. In this embodiment, the heat storage tank, designated as 40, is particularly distinguished from the prior embodiment in that a pair of flexible sheets 42 and 44 are bonded together through a sheet of non-adherent plastic such as TEDLAR, designated as sheet 45. (TEDLAR, is a trademark of E.I. duPont, for a partially fluorine substituted polyethylene/polypropylene). This material is selected for non-adhesiveness with the sidewall sheets 42 and 44. As indicated, sheet 45 is sized so as to be completely enclosed within the boundries or edges 46, 48, 50 and 52, as indicated in FIG. 6. Sheet 45 also includes cut-out openings 49. When sheets 42 and 44 are bonded together, as by pressure and heat, (portions of each will extend in their uncured state) from the sheets 42 and 44 through the openings 49 and adhere to each other. The thickness of sheet 45 is desirably on the order of 0.002 inch. As indicated in FIG. 5, communication between the two liquid carrying paths formed by bridges 62 and 64 may be provided by openings or holes 65 in sheet 45.

This embodiment further illustrates that the flexible sheets 42 and 44 can be advantageously reinforced with suitable fibers (or metal screens) which are substantially co-extensive with them. It will be noted here that the tensile fibers are fully embedded inside another pair of flexible sheets 58 and 60. When layers 42, 44, 45, 54 and 56 are pressed together, completed unit 40 forms the structure illustrated in cross-section by FIG. 5.

Figure 7B:
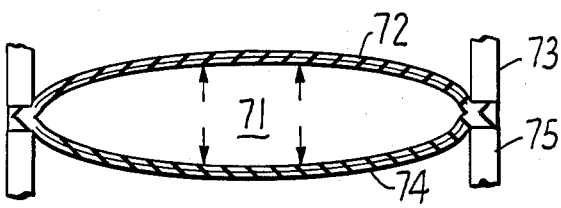
Figure 7C:
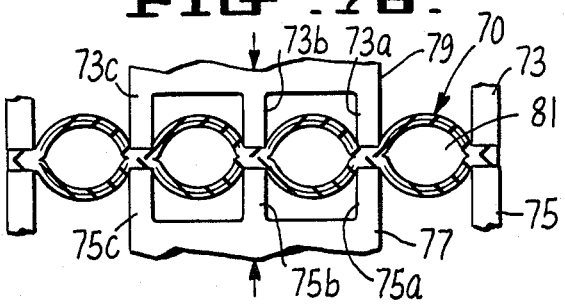

FIGS. 7A, 7B and 7C illustrate a still further method of assemblying a solar collector, heat exchanger, or storage tank of the flexible chamber, or panel, type shown in the previous embodiments. As particularly seen in FIG. 7C, a completed panel 70 is formed by a pair of sheets 72 and 74. As indicated in FIG. 7A, sheets 72 and 74 may be pressed together along their edges as indicated by the two halves 73 and 75 of an edge (and chamber) forming die. Although only two sealed sides are indicated it will be appreciated that the entire chamber 70 is sealed around the four sides so that the space between 72 and 74 can be inflated, as by air, into the form shown in FIG. 7B, and thus form open chamber 71. Following such inflation, the discrete, spaced apart areas, as in the patterns indicated in the prior embodiments, (and more fully described below) are formed by a second die, including halves 77 and 79. This die forms the internal compartments of panel 70 as a plurality of interconnected domed chambers, generally indicated as 81. It will be understood of course that one of the sheets 72 or 74 may include reinforcing fibers in the form of either a cloth or screen, as discussed above. It will be apparent that the two dies may be combined for simultaneous sealing of the periphera and discrete areas, followed by bonding of sheets 72 and 74.

Figure 8:
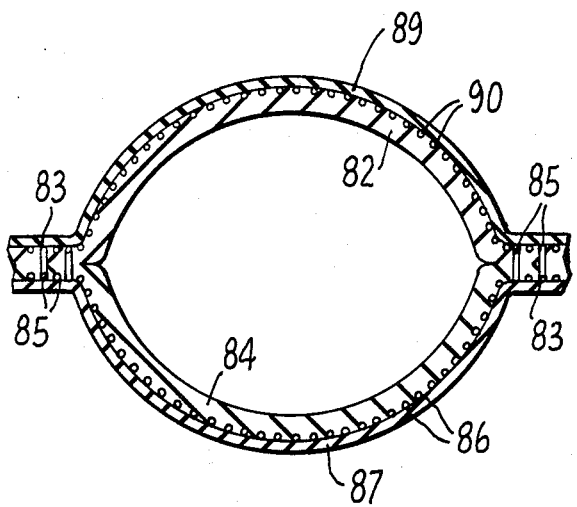
FIG. 8 is an alternative arrangement for sealing the edges of the structure and specifically indicates that the edges are stitched, in addition to thermo-plastic bonding of the outer edges of the flexible sheets to form the chamber.

FIG. 8 illustrates a further method of joining together flexible sheets such as 12 and 14 of FIG. 1, or 42, 44 of FIG. 4, or 72, 74 of FIGS. 7A-7C. As indicated in .FIG. 8 the enclosing edges can be sewn first by stitches 85 to bind the two sheets 82 and 84 together, as indicated at 83, prior to actual bonding of the outer sheets 87 and 89 to enclose either cloth or metal screen 86 in sheet 84 and screen 90 in sheet 82. Alternatively, the sheets may be stapled or otherwise mechanically attached together.

In the case where the sheets are coated with either a flexible curing material (such as EPDM) or a more rigid curing material (such as thermosetting plastic), the two woven fabric sheets 54 and 56 of Fig. 5 may be first stitched or stapled and in a later operation coated to give a leak-tight collector, heat exchanger or tank assembly. Note the coating must overlap the peripheral edges (e.e., edges 16, 18, 20, 22 of FIG. 1) to prevent leakage paths along the fibers of woven sheets 54 and 56. For the special case where a thermosetting plastic is used for coating the fabric sheets 54 and 56, the coated sheet assembly may be inflated in its uncured state and allowed to cure to form a rigid cavity. As shown in FIG. 8, the woven fabric 86 and 90 is almost completely encased by thermosetting plastic. An advantage of this method is that the fibers of the fabric 86 and 90, by virtue of the inflation prior to cure, take a shape which is best suited for pressurization in its cured state: most of the important load carrying membrane carry only tension loads. Alternatively, dies such as shown in FIG. 7A, 7B and 7C may be employed to restrain the stitched or stapled sheets 82 and 84 during cure of the thermosetting plastic. The point of contact between the two halves of the die (such as points 73a and 75b) would also be the point of stitching (such as point 83 in FIG. 8). In the preferred form of this embodiment, only a single die would be employed to bond both the periphery (as in FIG. 7A) and the discrete points (as in FIG. 7C).

Figure 9:
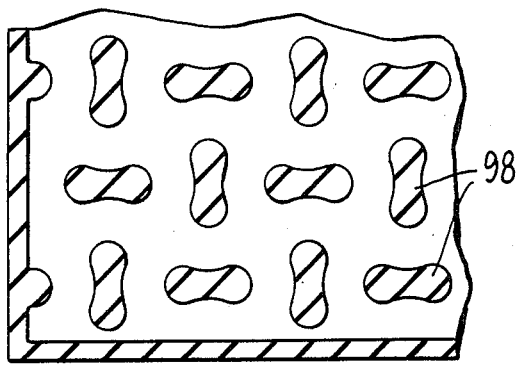
FIGS. 9–12 illustrate preferred embodiments of discrete bonded areas contemplated in forming the open chamber flow passages through the entire panel. Specifically
Figure 10:
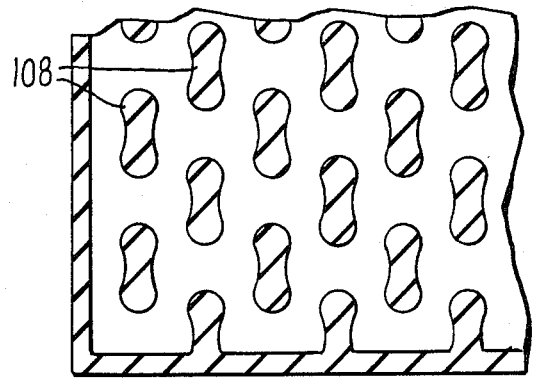
Figure 11:
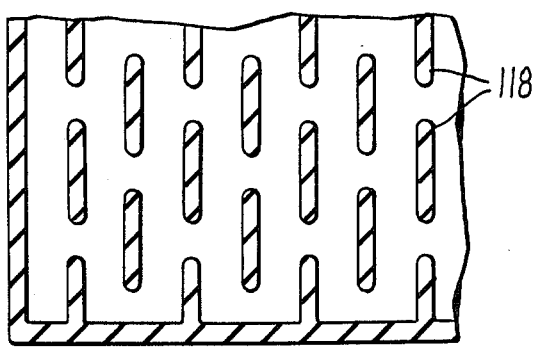
Figure 12:
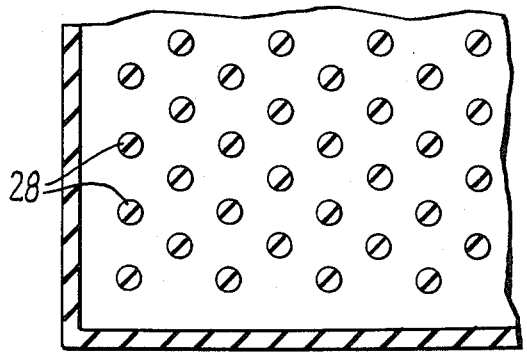

FIGS. 9, 10, 11 and 12 show alternate embodiments of the discrete, spaced apart, areas that bond together the flexible sheets such as 12 and 14 of FIG. 1 to form the collector or storage tank 10. FIG. 9 and 10 particularly show what may be called "dog bone" bonding areas 98 and 108, respectively. These give maximum adhesive strength to the bonded areas when the two sheets and the interior of the chamber are subjected to internal pressure as by freezing in the unit. The 90° orientation of alternate bonded areas as in FIG. 9, is particularly advantageous. However, the bonding pattern shown in FIG. 10 is quite satisfactory for durable service. The elongated, rectangular areas 118 shown in FIG. 11 are also structurally strong bonding areas. The arrangement 28 of FIG. 12 is the most readily and practically constructed configuration and as indicated in the embodiments of FIGS. 4, 5 and 6 particularly useful in the bonding through a center sheet, such as 45. Selection of the configuration of such discrete areas properly to seal and bond the sheets is a matter of choice for the expected service. Each of the disclosed or similar patterns is satisfactory for performing the method of the present invention and to construct the chambers formed thereby.

INDUSTRIAL APPLICABILITY TO APPARATUS

Figure 13:
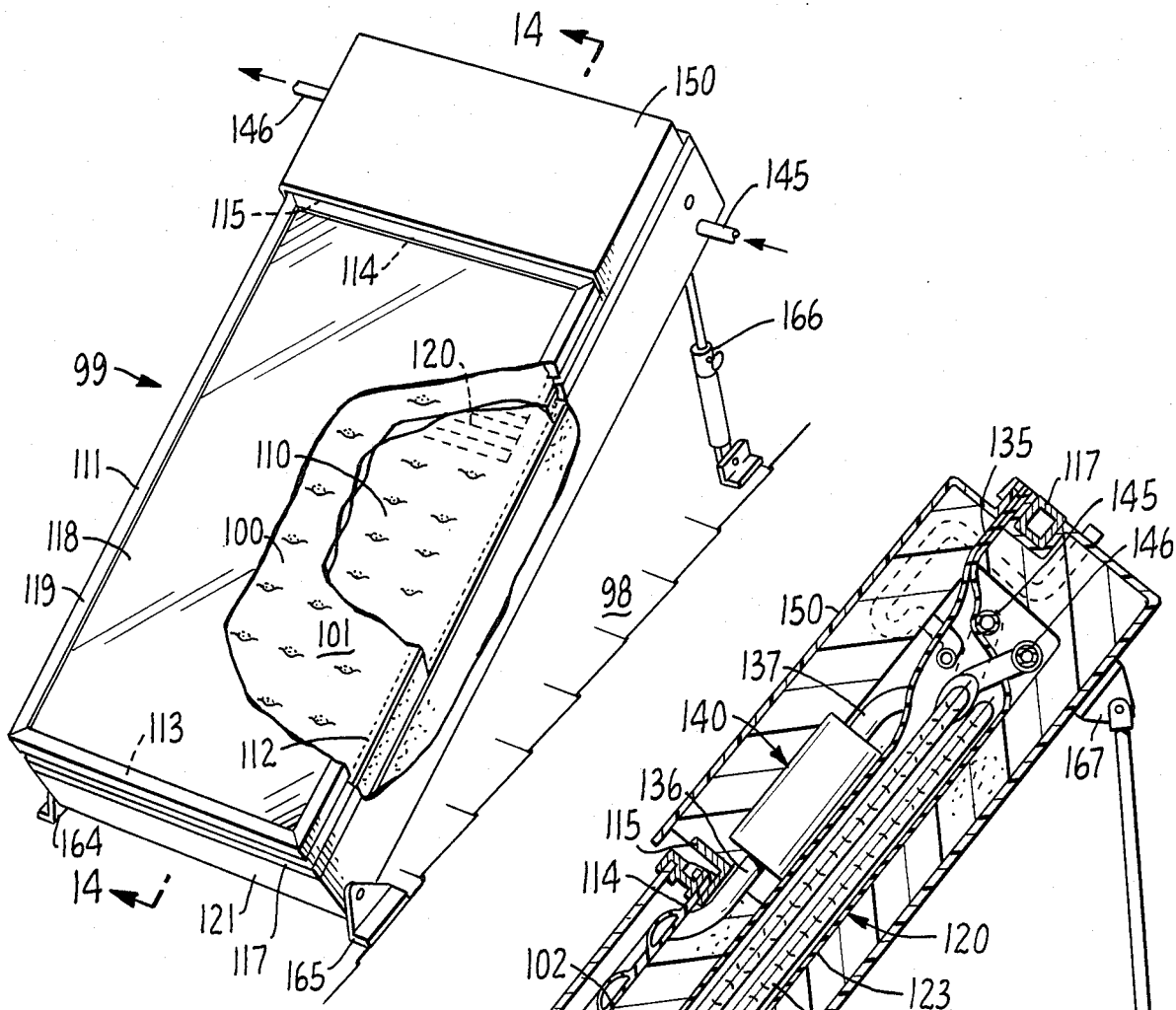
FIG. 13 illustrates a solar heater system wherein the solar collector and storage tank, including a heat exchanger, are constructed in accordance with the present invention and the units are mounted within a structure suitable for mounting on a roof or a ground-level pad.
Figure 14:
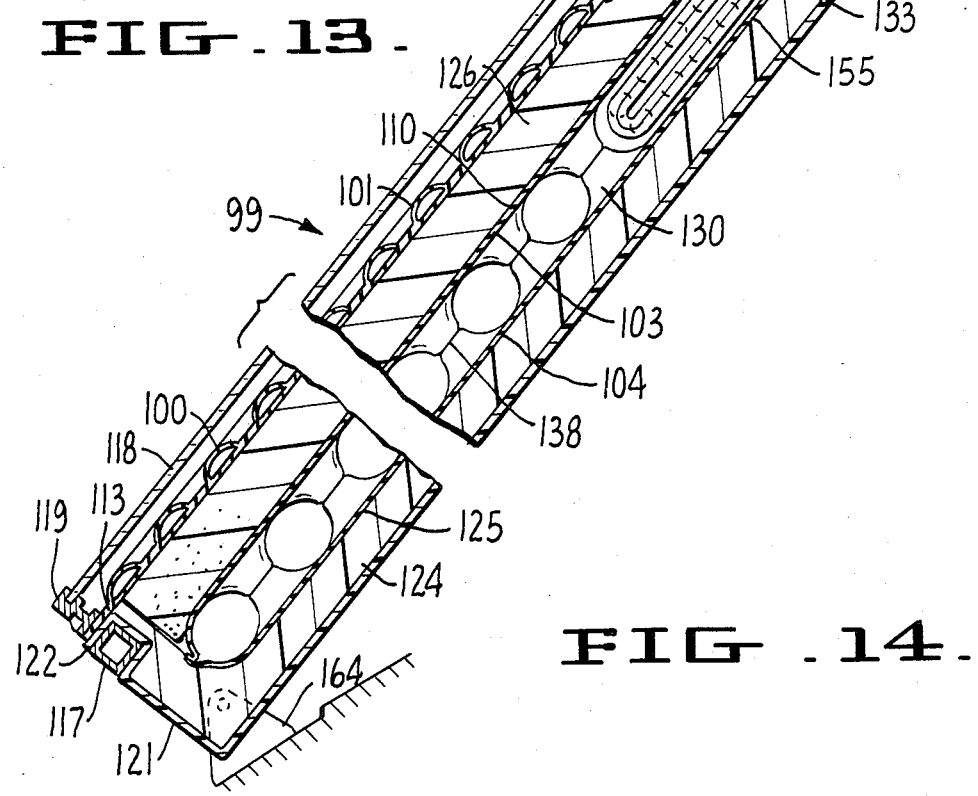
FIG. 14 is a cross-sectional view of the arrangement shown in FIG. 13 and particularly shows details of the storage tank having a heat exchanger coil inserted through one end of the open chamber with the sidewalls resealed about the inlet and outlet openings to the heat exchanger coil.

FIGS. 13 and 14 illustrates a solar water heating apparatus, indicated generally as 99, which includes a solar collector 100 and storage tank 110 constructed in accordance with the present invention. As there shown, units 100 and 110, by virtue of the tensile filaments in at least one sheet such as 14 of FIG. 1, permits the liquid volume so formed to be controlled. As indicated, the solar absorption surface sheet 101 of solar collector 100 is permitted to bulge or expand more than back sheet 102. In storage tank 110, both flexible sidewall sheets 103 and 104 are allowed to bulge to form the desired storage volume for heated liquid.

Since both solar panel 100 and storage tank 110 are specifically constructed to be non-rigid structures, mounting of such elements is accommodated for installation by a relatively lightweight shell on box 121 formed. Box 121 thus forms a "bed" for storage tank 110 by an insulation liner 124. Liner 124 may be cast in place, using foamed polyurethane or other plastic material, or made of fiberglass with supports for the weight of tank 110 when filled with water.

As further shown in FIG. 14, an insulating member 126, overlies sidewall sheet 103 of tank 130 to insulate liquid in tank 110 when liquid temperature in solar collector 100 is lower than ambient, such as at night, or during inclement weather. This member may be preformed, or cast in place with foamed plastic.

To support shell 121 and bed 124 rigidly, a square bar member 117 is fitted into channel 122 so it surrounds box 121. As backing to the upper edge of box 121, it also provides a clamping surface for holding the edges 111, 112 and 113 of solar panel 100. Upper edge 114 of panel 100 is conveniently clamped against a cross member, such as structural member 115, also supported by bar 117. Clamping of edges 111, 112, 113 and 114 is by a rectangular frame member 119 which supports cover glass 118 above the surface of solar panel 100. Frame 119 is secured to bar 117 by any suitable means such as sheet metal screws, clamps, etc. (not shown). Bar 117 also secures the upper end 135 of storage tank 110 after it has been sealed with heat exchanger 120 enclosed in the upper end 155 of tank 110. As discussed above, upper end 135 is desirably left unbonded during formation of tank 110 so that heat exchanger 120 can be installed as a unit. In the volume, of tank 110, discrete spaced apart bonded areas 138 of lower portion 125 of tank 110 are omitted from about $\frac{1}{3}$ to $\frac{1}{4}$ of chamber volume 130.

As indicated, heat exchanger 120 comprises a serpentine arrangement, preferably copper or stainless steel piping (for good heat conduction). In FIG. 14, this is shown by as pipe coil 133. Conveniently, for maximum heat exchange capacity and light weight, coil 133 can be formed by the "roll bond" method, similar to those now used in household refrigerators. The ends of coil 133 are connected to a hot water supply system, as by cold water inlet line 145 and heated water outlet line 146. Alternatively, as noted above, the heat exchanger itself may be constructed from sheets bonded together in the manner described herein; such as that shown in FIG. 8 to form multiple parallel passages such as those shown in FIG. 11. As shown, the wall, such as 123, of storage tank 110 is sealed around the portions of coil 133 passing therethrough. After installation of heat exchanger 120, upper edge 135 is sealed by clamping the edges of sheet 103 and 104.

To form a closed circulation system, the inlets and outlets of collector panel 100 and tank 110 are arranged to interconnect complementarily. For passive operation, as in the present embodiment, a one way valve, indicated as 140 is in the flow path through outlet 136 of collector 100 and inlet 137 of storage tank 110. This valve permits a one-way flow and in this arrangement serves as a "thermic diode". Its primary function is to prevent back-flow of hot water stored in heat storage tank 110 to collector 100 when the latter cools off at night or in inclement weather. U.S Pat. Nos. 4,137,964 and 4,050,508 disclose forms of such a valve. Alternatively, U.S. patent application Ser. No. 216,677, H. W. Sigworth, Jr., assigned to the assignee of this application, discloses an alternate form of such a valve.

One way valve 140, and the upper end of storage tank 110 are enclosed by a cover plate 150 secured by any suitable means to structural member 115 and through lip 122 to bar 117.

To mount apparatus 99 on roof 98, base mounting supports 164 and 165 are connected to the bottom corners of the box 121. The top of apparatus 99 is then tilted to a desired angle, as determined by geographic latitude, by adjustable arms 166, pivoted to bar 167 secured to the upper portion of bar member 117.

The principles, preferred embodiments and modes of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, all such variations and changes, which fall within the spirit and scope of the present invention as defined in the following claims, are expressly intended to be embraced thereby.

What is claimed is:

1. Method of forming a heat exchanger, solar heat collector or storage element having flow passages therethrough which comprises:
   bonding a flexible pair of non-metallic sheet members directly to each other at a plurality of discrete areas of similar size and similarly spaced apart with respect to each other, at least one of said sheet members having heat-transfer promoting filaments embedded therein, and said heat-transfer filaments being substantially coextensive with said spaced apart areas for equalization of thermal stresses and for readily transferring heat between the bonded and unbonded portions of said non-metallic sheet members, and
   sealing along at least one pair of parallel opposed edges of said sheet members to form longitudinal flow passages generally parallel to said edge but with free lateral communication of fluid between said sheet members along substantially the entire length of the passages for equalizing fluid temperatures across said panel when the resulting unbonded volume between said sheet members is filled with fluid.

2. Method of claim 1, wherein said heat-transfer filaments are formed as a cloth extending over the enclosed area of at least one of said sheets, to give structural strength thereto and said heat transfer filaments are metal in at least one of the woven strands of said cloth to increase heat conduction from said bonded areas to the unbonded areas.

3. Method of claim 2, wherein said heat-transfer filaments are formed as a metal screen.

4. The method of claim 1, wherein said heat transfer filaments are in a woven cloth and said cloth is embedded in said at least one sheet, and the bonding of said pair of sheets at said discrete areas, sealing of said opposed edges and embedding of said cloth in said at least one sheet are performed substantially simultaneously.

5. Method of claim 2 wherein said metal filaments are so embedded in said at least one sheet that fluid flowing through said sheet members is not exposed to said filaments.

6. An article of manufacture suitable for use as a heat exchanger tank or solar collector in a solar water heating system comprising:
   a pair of flexible non-metallic sheet members bonded directly to each other around their peripheral edges and additionally bonded at a plurality of discrete areas of similar size, each area being similarly spaced longitudinally and laterally with respect to each other over the enclosed surface of said sheet members, such that fluid flow is permitted from opposed edges over substantially the entire lateral and longitudinal lengths of the article,
   heat conductive filaments for readily transferring heat embedded in one of said sheet members to promote heat transfer and to equalize thermal stresses between said bonded areas and the unbonded areas of said sheet members, and
   fluid connector means formed adjacent two opposed peripheral edges of said sheet members for admission and withdrawal of fluid from said article.

7. An article of manufacture in accordance with claim 6, wherein the other of said flexible sheet members does not include said heat conductive filaments so that said other sheet member may expand more freely between said discrete areas to form enlarged fluid passageways therethrough while said heat conductive filaments in said one sheet member provide dimensional stability to said article.

8. Method of forming an expandable fluid container for a heat exchanger, solar heat collector or storage element having flow passages therethrough which comprises:
   mechanically connecting together a pair of impermeable flexible, non-metallic sheet members at a plurality of discrete bondable areas of the contacting surfaces of said sheet members, said discrete areas being of similar size and similarly spaced apart with respect to each other,
   mechanically connecting together at least one pair of parallel opposed edges of said sheet members, the opposing surfaces of said sheet members being bondable laterally inwardly from said edges to form longitudinal flow passages generally parallel to said edges but permitting free lateral communication of fluid between said sheet members along substantially the entire length of the passages for equalizing fluid temperatures across said panel when the resulting unbonded volume between said discrete bondable areas of said sheet members if filled with fluid, and
   bonding said sheet members together to enclose at least the mechanical connection within said discrete areas and along said opposed edges to prevent fluid contact with said mechanical connections and said mechanical connections preventing unbonding of said areas and said edges by fluid pressure within said unbonded volume of said heat exchanger solar panel or storage element.

9. The method of claim 8, wherein the step of bonding includes bonding a sheet material having reinforcing fibers therein substantially coextensive with the external side of at least one of said sheet members.

10. The method of claim 8, further comprising embedding heat-transfer promoting filaments in at least one of the sheet members, said heat-transfer promoting filaments extending across said discrete bonded areas to the adjacent unbonded areas of at least one of said sheet members.

11. An article of manufacture suitable for use as an expandable heat exchanger tank or solar collector in a solar water heating system comprising:
   a pair of fluid impermeable, flexible sheet members sewn directly to each other around their peripheral edges and additionally sewn at a plurality of discrete areas of similar size, each area being similarly spaced longitudinally and laterally with respect to each other over the enclosed surfaces of said sheet members, such that fluid flow is permitted from opposed edges over substantially the entire lateral and longitudinal lengths of the article, means for sealing the inner surfaces of said sheet members together at least around said sewn edges and said sewn discrete areas to prevent fluid therein from contacting the sewn connections for said sheet members and said sewn connections prevent peeling stresses between said sheet members from unbonding said edges and said discrete areas when said article is inflated by fluid flowing therethrough, said means for sealing said inner surfaces of said sheet members together including an inner sheet material substantially coextensive with and bonded between the internal surfaces of said sheet members, and fluid connector means formed adjacent two opposed peripheral edges of said sheet members for admission and withdrawal of fluid from said article.

12. An article of manufacture suitable for use as an expandable heat exchanger tank or solar collector in a solar water heating system comprising:

a pair of fluid impermeable, flexible sheet members sewn directly to each other around their peripheral edges and additionally sewn at a plurality of discrete areas of similar size, each area being similarly spaced longitudinally and laterally with respect to each other over the enclosed surfaces of said sheet members, such that fluid flow is permitted from opposed edges over substantially the entire lateral and longitudinal lengths of the article, heat transfer filaments embedded in at least one of said sheet members, said filaments being coextensive with said discrete areas and the adjacent unsewn areas of at least one of said sheet members, and fluid connector means formed adjacent two opposed peripheral edges of said sheet members for admission and withdrawal of fluid from said article.

* * * * *